Aug. 7, 1945.　　　　F. CARTLIDGE　　　　2,381,108
GATHERING AND LOADING MACHINE
Filed Oct. 19, 1942　　　7 Sheets-Sheet 1
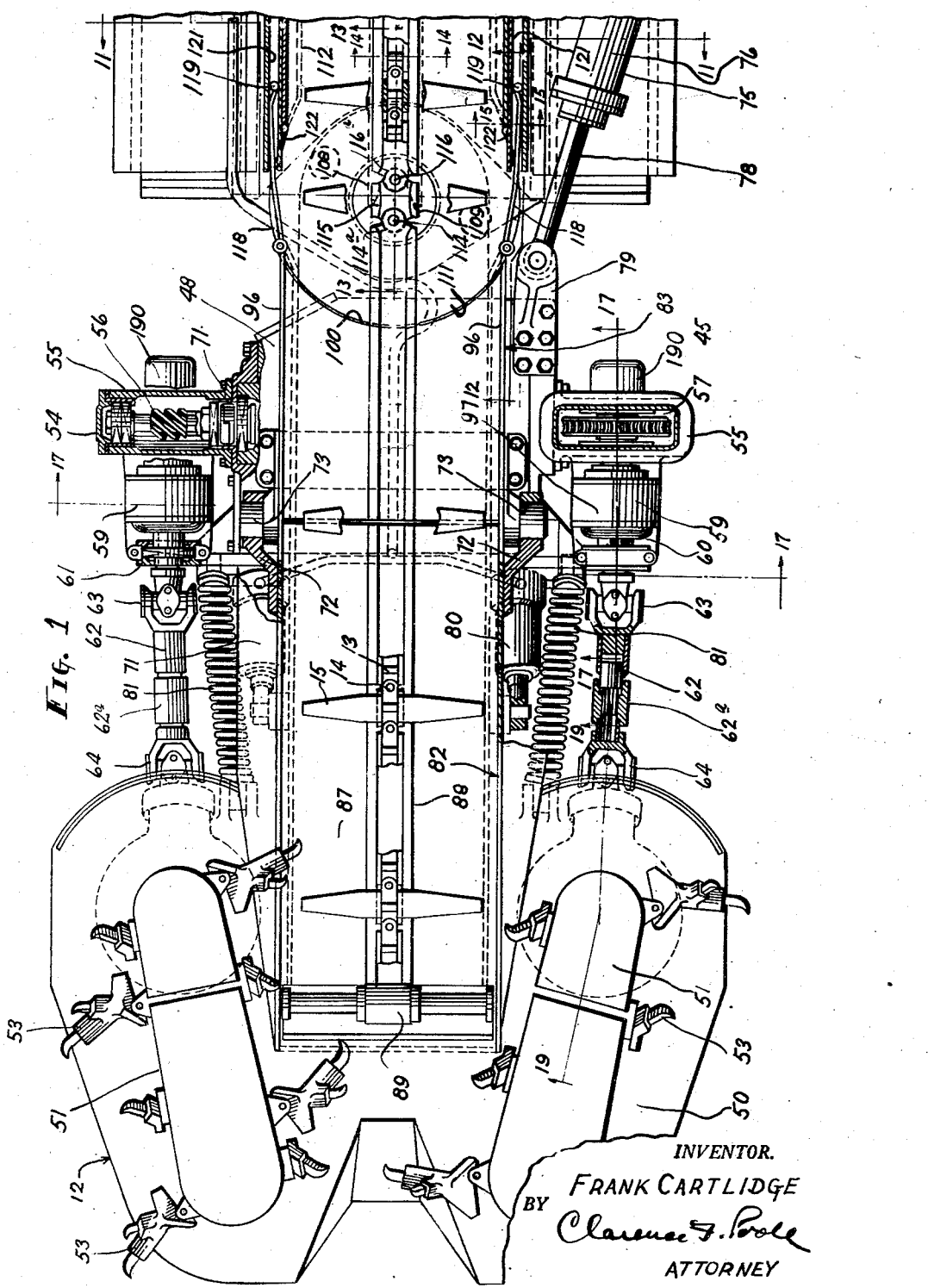
INVENTOR.
FRANK CARTLIDGE
BY Clarence F. Poole
ATTORNEY Aug. 7, 1945.　　　　F. CARTLIDGE　　　　2,381,108
GATHERING AND LOADING MACHINE
Filed Oct. 19, 1942　　　7 Sheets-Sheet 2
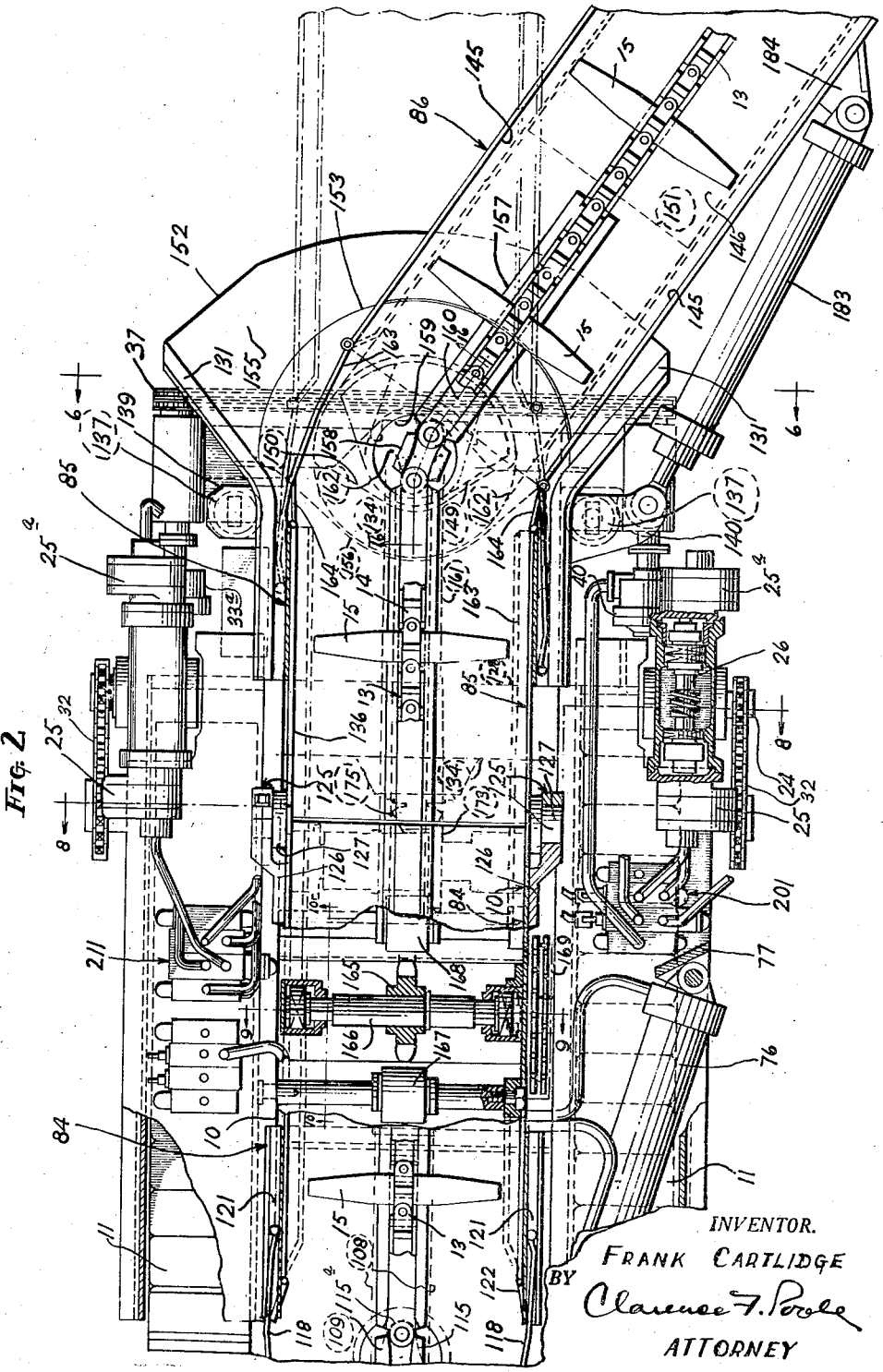
INVENTOR.
FRANK CARTLIDGE
BY Clarence F. Poole
ATTORNEY

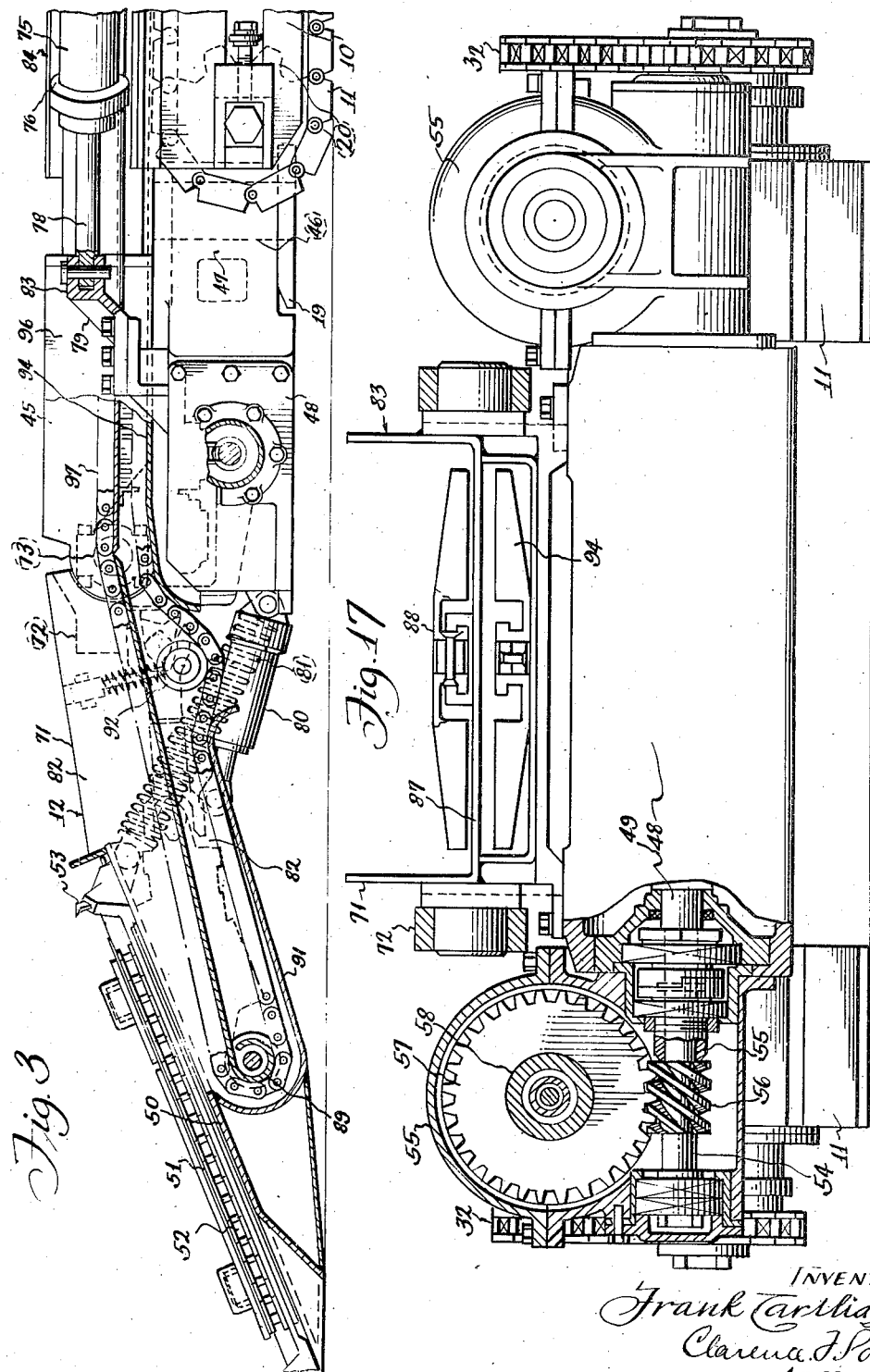

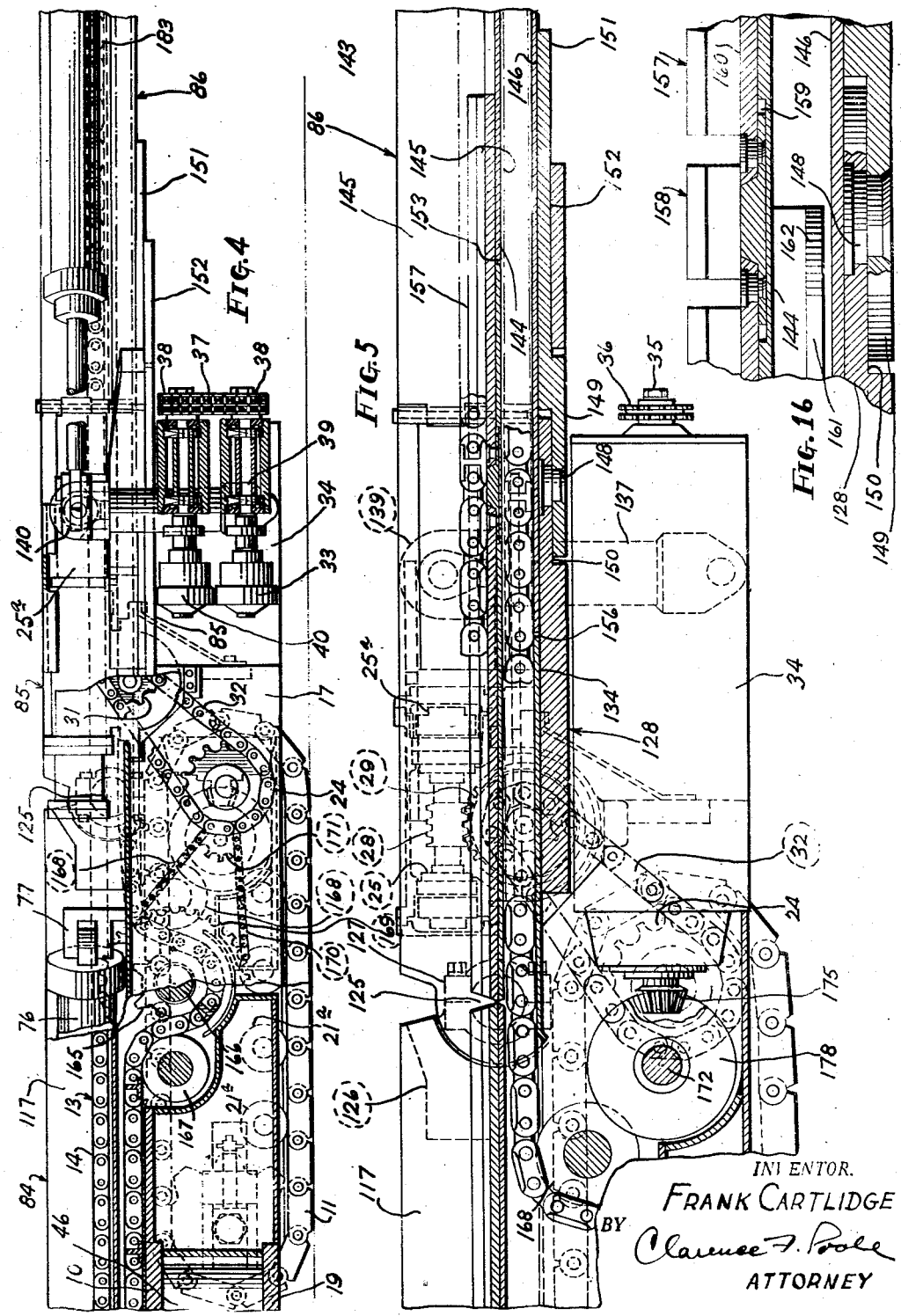

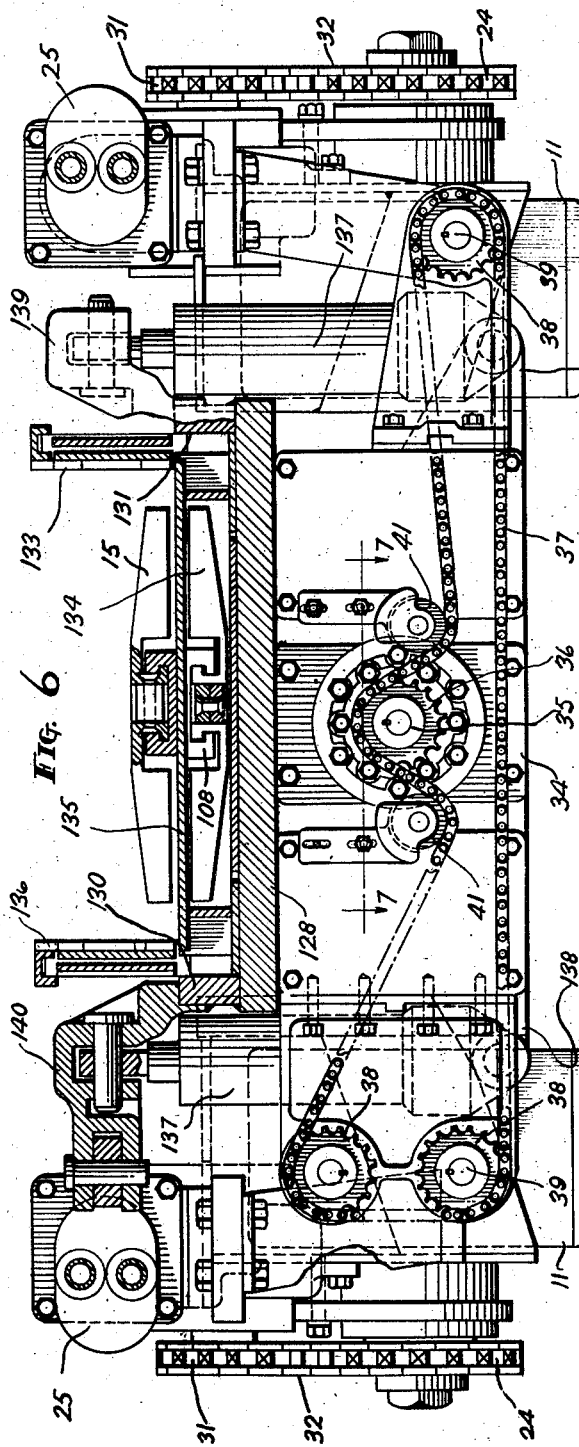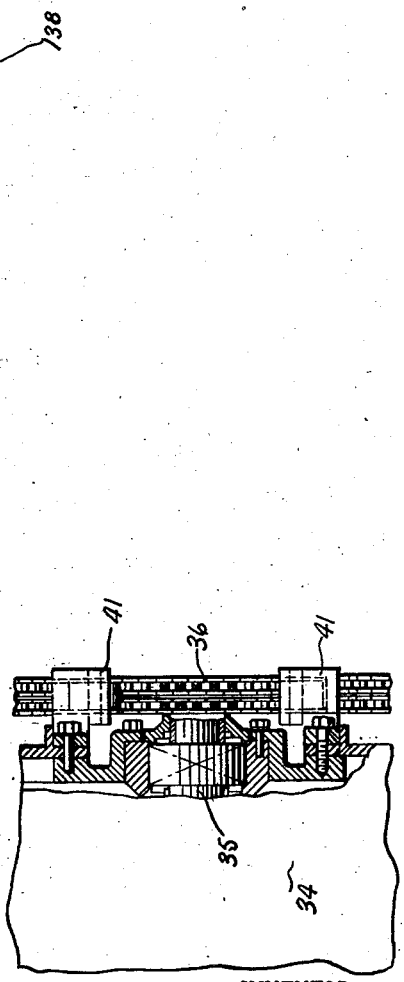

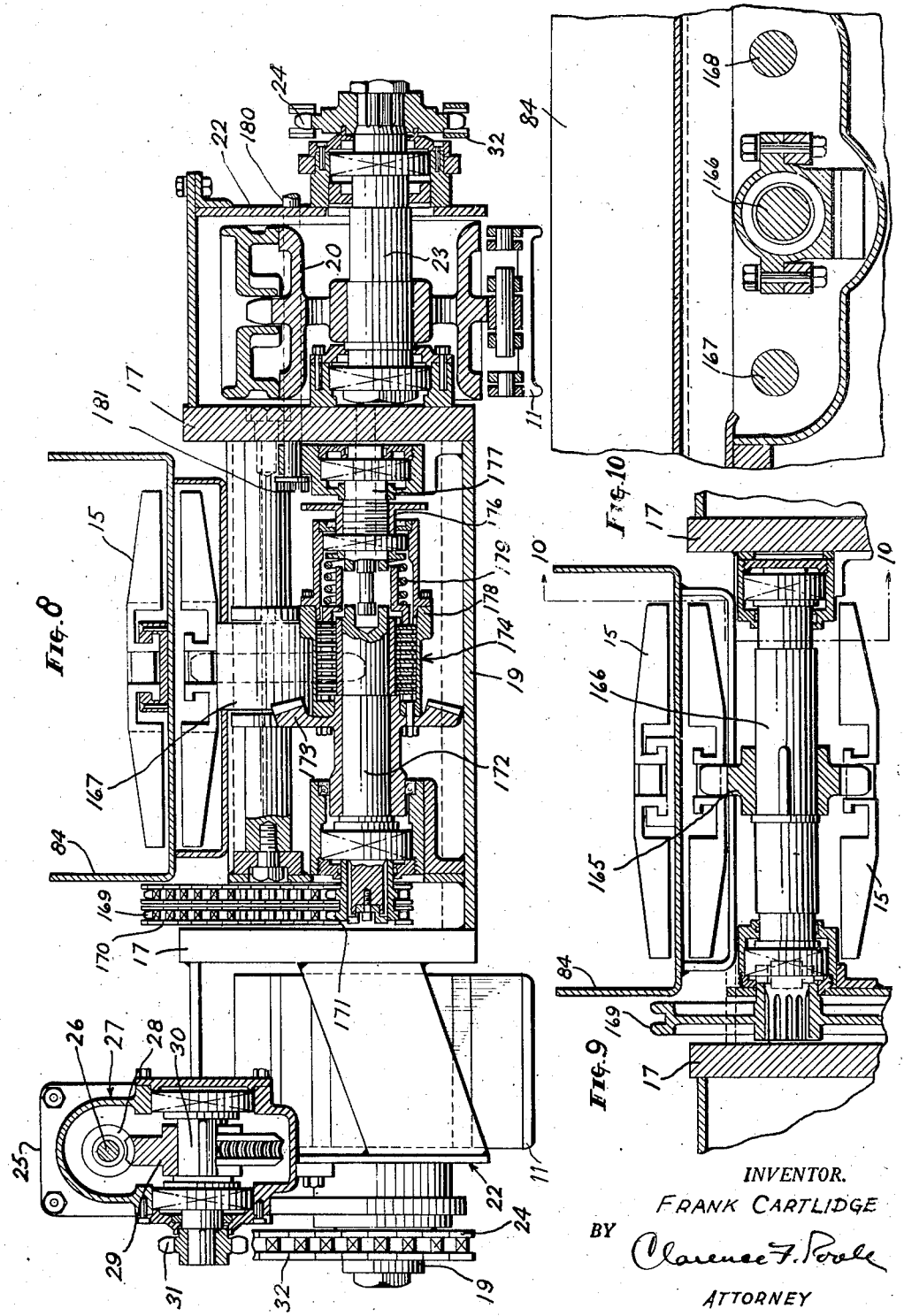

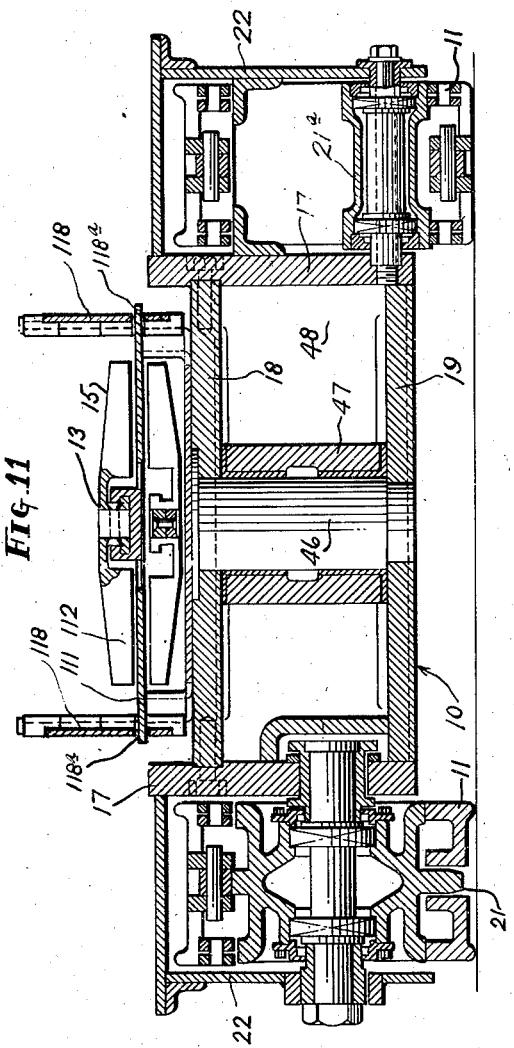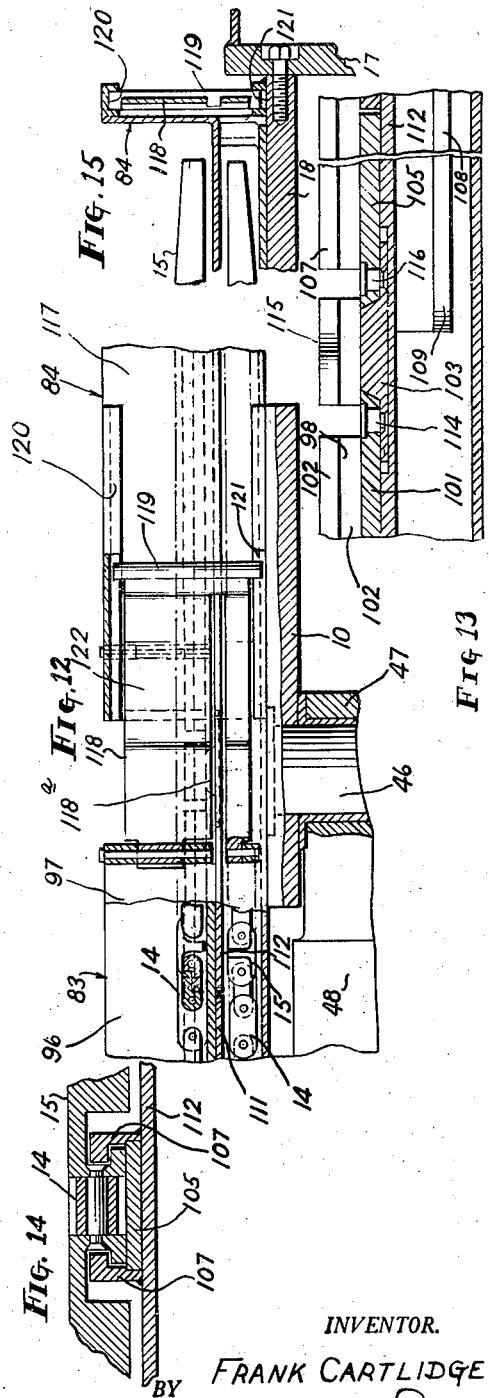

Patented Aug. 7, 1945

2,381,108

UNITED STATES PATENT OFFICE 2,381,108

GATHERING AND LOADING MACHINE

Frank Cartlidge, Chicago, Ill., assignor to Goodman Manufacturing Company, Chicago, Ill., a corporation of Illinois Application October 19, 1942, Serial No. 462,506

4 Claims. (Cl. 198—109)

This invention relates to improvements in gathering and loading machines adapted to load coal or other loose material at the working face of a mine.

The principal objects of the invention are to provide a simple and efficient machine of the character described, mounted on endless treads, designed to operate in low seams of coal, and provided with hydraulic operating and control devices affording greater ease and flexibility of manipulation and control, with a resultant increased loading capacity over former machines used for this purpose.

Other objects of the invention will appear from time to time as the following specification proceeds, and with reference to the accompanying drawings, in which:

Figure 1 is a fragmentary top plan view showing the front or gathering end of a machine constructed in accordance with my invention, with certain parts broken away and shown in section to show details of construction;

Figure 2 is a fragmentary top plan view forming in effect a continuation of Figure 1, and showing the main part of the machine, with the rear or discharge end of the main conveyer broken away, and with certain other portions shown in section;

Figure 3 is a vertical section taken on certain longitudinal planes, showing the front portion of the machine included in Figure 1;

Figure 4 is a vertical section taken on certain longitudinal planes, constituting in effect a continuation of Figure 3, and showing the main part of the machine;

Figure 5 is an enlarged detail section, showing the rear part of the machine, taken generally along the center line of the conveyer;

Figure 6 is a transverse section taken generally on line 6—6 of Figure 2;

Figure 7 is a detail section taken on line 7—7 of Figure 6;

Figure 8 is a transverse section taken on line 8—8 of Figure 2;

Figure 9 is a detail section taken on line 9—9 of Figure 2;

Figure 10 is a detail section taken on line 10—10 of Figure 2;

Figure 11 is a transverse section taken on line 11—11 of Figure 1;

Figure 12 is an enlarged fragmentary detail view in side elevation, with certain parts broken away and certain other parts shown in substantially longitudinal section;

Figure 13 is an enlarged detail section taken on line 13—13 of Figure 1;

Figure 14 is an enlarged detail section taken on line 14—14 of Figure 1;

Figure 15 is a section taken on line 15—15 of Figure 1, showing details of the flexible conveyer wall structure;

Figure 16 is an enlarged detail section taken on line 16—16 of Figure 2; and

Figure 17 is a transverse section taken generally on line 17—17 of Figure 1.

Referring now to details of the embodiment of my invention illustrated in the drawings, the main elements of the machine consist of a main frame 10 mounted on a pair of endless treads 11, 11 and having an inclined gathering element or loading head 12 disposed in advance of said main frame, and a conveyer 13 extending from the gathering element rearwardly over the main frame and beyond the rear end of the latter in overhanging position so as to discharge material into mine cars or the like. Said conveyer is of the single center strand endless chain and flight type including an endless chain 14 having spaced apart flights 15, 15 secured thereto and projecting laterally therefrom in opposite directions.

The main frame 10 includes a pair of upright side frame members 17, 17, a deck plate 18 and a bottom plate 19 (see Figure 11). The endless treads 11, 11 are suitably mounted at opposite sides of the side frame members on drive sprockets 20, 20 near the rear end of the frame, idler sprockets 21, 21 at the front of the frame, and a plurality of intermediate bogie wheels 21a, 21a. Said sprockets and bogie wheels are supported on suitable shafts which have bearing at their inner ends on the main frame and at their outer ends in overhanging brackets 22 at opposite sides of the frame. Details of the endless tread structure and its supporting means need not be described further, as they form no part of the present invention, excepting to point out that drive shafts 23, 23 of the drive sprockets 20, project outwardly beyond the overhanging supporting brackets 22, 22 and have chain drive sprockets 24, 24 fixed thereon to provide independent driving connections for each of said endless treads from a pair of hydraulic motors 25, 25a mounted at each side of the main frame (see Figure 8).

The drive connections from each pair of hydraulic motors 25, 25a to its respective endless tread form the subject matter of my divisional application Serial No. 488,644, filed May 27, 1943, so need not be described in detail in the present application.

The gathering element 12 is supported for vertical tilting movement on an intermediate frame 45, which in turn is pivotally connected at the front end of the main frame 10, for lateral swinging movement. The pivotal support for said intermediate frame is shown in Figures 3 and 11, and consists of an upright pivot post or king pin 46 mounted in and extending between the top plate 18 and the bottom plate 19 of the main frame. A cylindrical bearing member 47 of frame 45 is journaled on said post, and said frame projects forwardly therefrom beneath the conveyer 13, to form a support for a swivelling portion thereof, as will presently be described in detail. An electric motor 48 is mounted at the front end of said intermediate frame, to provide the motive power for the gathering chains of the gathering element.

The gathering element 12 herein shown is of the familiar type including an inclined gathering plate 50 extending along opposite sides of the front end of the conveyer 13 and across the front end thereof. A pair of chain guiding members 51, 51 having endless chains 52, 52 mounted for orbital movement thereabout, are mounted as usual on said plate, along opposite sides and forwardly of the conveyer. A plurality of gathering arms 53, 53 are carried by said chains, for picking up material from the ground and moving it along said plate onto the conveyer.

The gathering chains 52 are driven from the electric motor 48 by suitable means, such as the mechanism disclosed and claimed in my divisional application, Serial No. 488,603, filed May 26, 1943, so a detailed description of such drive mechanism is omitted from this application.

The inclined plate 50 is supported forwardly of the intermediate frame 45 by spaced upright side plates 71, flared outwardly along their upper margin and having trunnion bearings 72, 72 at their rear ends connected to trunnions 73, 73 fixed at opposite sides of the intermediate frame 45 (see Figures 1 and 17) so as to permit vertical tilting adjustment of the gathering element. The gathering element 12 and intermediate frame 45 are swung laterally relative to the main frame 10 by a hydraulic extension device 75, as herein shown, consisting of a cylinder 76 having its base pivotally mounted on a bracket 77 at one side of the main frame, and a piston rod 78 pivotally connected to a bracket 79 fixed at one side of the intermediate frame 45 (see Figures 1 and 2).

The gathering element has tilting adjustment on trunnions 72, 72 relative to the intermediate frame 45, by a pair of hydraulic cylinder extension devices 80, 80 of the usual cylinder and piston form, each having one end pivotally connected to the base of said intermediate frame, and the other end pivotally connected to the under side of the gathering element, as is best shown in Figure 3. A pair of coil springs 81, 81 are also interposed between the base of the intermediate frame and the rear end of the inclined plate 50, so as to yieldingly support a part of the weight of the gathering element in its various tilted positions.

The conveyer 13, which extends continuously from the gathering element 12 to the rear end of the machine, consists generally of a plurality of aligned trough sections, arranged in the following order: a front inclined trough section 82, tiltable vertically with the gathering head on a transverse axis; a horizontal trough section 83 mounted on and swinging laterally with the intermediate frame 45; a horizontal trough section 84 fixed on the forward part of the main frame 10; a vertically tilting trough section 85 connected thereto on a transverse axis near the rear end of the main frame (see Figures 4 and 5); and finally a laterally swinging trough section 86, pivotally connected to the rear end of the section 85 and overhanging the rear of the machine, as shown in Figures 2 and 4.

Referring now to details of the conveyer 13, its center strand conveyer chain 14 is of a well known laterally flexible gibbed type, the links of which are pivotally movable about vertical as well as horizontal axes and are adapted to ride in a series of aligned guide or gib sections which extend almost the full length of the conveyer, but permit relative vertical and lateral swinging movements of the several sections of the conveyer, as will now be described.

The front section 82 of the conveyer includes a U-shaped trough member having a bottom plate 87, extending at an intermediate inclined angle relative to the gathering plate 50, upwardly to a termination point in line with the axis of the trunnions 73, 73 about which the gathering head and said front conveyer section are tiltable on a transverse axis (see Figures 1, 2 and 17). The side walls of the front conveyer section 82 are formed by the side plates 71, 71 of the loading head, previously mentioned.

The floor plate 87 has a gib section 88 fixed along its upper surface, in which the conveyer chain 14 is guided as usual while passing upwardly along the front section 82. The conveyer chain passes over an idler roller 89 at the front end of the conveyer, and as it passes rearwardly beneath the floor plate 87, it passes over a bottom plate 91 and below a tensioning idler roller 92. In the form shown, said conveyer chain is led upwardly from the idler roller over a curved front apron 93 of an under pan 94 which is mounted on the second conveyer section 83, as will presently appear.

The second conveyer section 83 extends from the rear edge of the front section 82 rearwardly over the intermediate frame 45 to the area of articulation adjacent the upright pivot pin 46 about which said intermediate frame swings laterally. Said conveyer section includes a U-shaped trough member having side walls 96, 96 and floor plate 97, with a gib section 98 along its upper face. The under pan 94 is disposed beneath the floor plate, for guiding the return strand of the conveyer. The meeting edges of the side walls 71 and 96, and gib sections 88 and 98, are cut away to form V-shaped openings, to permit the desired tilting adjustment of the parts.

The rear end of the floor plate 97 of trough section 83 terminates on a concave arcuate rear edge 100, in abutment with a front widened deck portion 111 of floor plate 112 of the third trough section 84. The deck portion 111 is concentric with the axis of articulation determined by the pivot pin 46 (see Figure 1).

The gib section 98 projects rearwardly over the upper surface of the widened deck portion 111 to a point adjacent the axis of articulation. A plate 105 is slidably mounted between the upright side members of the gib section 107 on deck plate 111 of conveyer section 84 at the front end of the latter, and the front end of said plate is connected by a pivot pin 116 to an intermediate gib section 115 (see Figure 13). Said gib section 115 is recessed at 103 for lateral movement in the deck plate 111, and is connected by pivot pin 114 to the rear end of bottom plate 101 of gib section 98. The sliding plate 105 has sufficient endwise movement to permit the intermediate gib member 115 to adjust itself to various angular positions, when the trough sections 82 and 83 are swung laterally relative to the trough section 84.

The under pan 94 of trough section 83 is generally U-shaped in cross section, but has its side walls cut away at its rear end, (see Figures 11 and 12), so that it projects at its floor level beyond the pivot pin 46 and terminates with a concentric arcuate rear edge, in abutting relation with an under pan of trough section 84, as will presently appear.

The upright side walls 117, 117 of trough section 84 terminate in spaced relation with the side walls 96, 96 of trough section 83 at opposite sides of the area of articulation of said trough sections. To close this gap between the side walls of said trough sections, a pair of side plates 118, 118 are hinged to the rear ends of the side walls 96, 96 of trough section 83, and extend rearwardly along the outer sides of side walls 117, 117 of trough section 84 (see Figures 1, 11, 12 and 15). In the form shown herein, said side plates have longitudinal slots 118a, 118a therein, permitting the lateral edges of the widened deck portion 111 to project therethrough, as shown in Figure 11, so that the side plates 118, 118 form lateral closures both above and below said deck plate. The free ends of said side plates 118, 118 have pins 119, 119 riding in longitudinally extending guides 120, 121 suitably fixed along the upper and lower edges, respectively, of the trough section 84. Said side plates 118, 118 are preferably bowed or bent outwardly in horizontal direction near their free ends, as shown, so as to accommodate themselves readily to the various angular positions they assume during swinging movement of trough section 83.

An auxiliary hinged plate 122 is also mounted on the front end of each side wall 117 and projects forwardly under pressure of suitable yielding tension means (not shown) into sliding engagement with the outer surface of the adjacent side plate 118.

The lower or return reach of the conveyer has its chain positively guided along the trough section 84 by a centrally disposed gib member 108 fixed on the under face of floor plate 112 and terminating in flared sides 109, 109 at the axis of articulation (see Figure 1) so as to receive the chain in all laterally adjusted positions of the front trough sections 82 and 83. In the latter sections, the under or return reach of the conveyer is guided in their respective under pans.

The vertical tilting trough section 85 is pivotally connected to trough section 84 by a trunnion device which is somewhat similar to the trunnioned connection between trough sections 82 and 83, previously described. In the form shown, a pair of trunnion bearings 125, 125 are supported on the main frame 10 by brackets 126, 126 at the rear end of trough section 84, and have trunnion bearing members 127, 127 of trough section 85 pivotally connected thereto, on a transverse axis substantially in alignment with the floor plate 112 of the relatively fixed trough section 84 (see Figure 2). The brackets 126, 126 project laterally and rearwardly from opposite sides of the trough section 84, while the trunnion members 127, 127 of trough section 85 extend outwardly from side walls 136, 136 of said trough section 85.

The side walls 136, 136 are connected together by a floor plate 135 to form the conveyer trough of the trough section 85, said conveyer trough and under pan being substantially the same in cross section as the troughs and under pan of trough section 84 (see Figure 8) and the trough section 83 (Figure 18).

The trough section 85 rests on a supporting frame 128 having upright sides 130 and 131. Said trough section with its supporting frame 128 is bodily elevated about the axis of the trunnion members 127, 127 by a pair of hydraulic cylinder devices or jacks 137, 137 extending vertically at opposite sides of the main frame 10 and having their lower ends pivotally connected to brackets 138, 138, mounted adjacent the lower part of the motor 34. The upper ends of said hydraulic cylinder devices or jacks are pivotally connected to overhanging brackets 139, 140, fixed to opposite upright sides 130 and 131 of the supporting frame 128 and extending upwardly and laterally from said sides (see Figure 6).

The laterally swinging rear trough section 86 consists essentially of a U-shaped trough member 143 having a floor 144 and side walls 145, 145, and with an under pan 146 secured therebeneath, similar to the general troughing arrangement of the other trough sections previously described. The articulated connection between said trough section 85 and the trough section 86, shown herein, is somewhat similar to the articulated connection between trough sections 83 and 84, previously described, excepting for certain details as will presently appear.

The lower floor plate 134 of trough section 85 has an upright centrally disposed pivot pin 148 near its rear end, on which a horizontal fan-shaped plate 149 is pivoted. The plate 149 is preferably disposed in a recessed portion 150 in the under side of said bottom plate, and extends rearwardly from the latter and terminates into a supporting plate 151 which extends rearwardly along the trough section 86 beneath its under pan 146.

The outer side frame members 130, 131 of the supporting frame 128 extend rearwardly from the body of the latter and have diverging rear ends, between which is connected an arcuate horizontal bearing plate 152. Said bearing plate extends transversely beneath the supporting plate 151, as shown in Figures 2 and 4, to form a cradle upon which said supporting plate 151 is supported in sliding engagement, in the various positions of lateral adjustment of trough section 86.

The floor plate 144 of trough member 143 terminates on an arcuate line 153, concentric with the pivot pin 148, and abutting the arcuate rear edge 154 of a widened rear end portion 155 of the trough floor plate 135 (see Figure 2). The under pan 146 has its bottom plate extending forwardly of the pivot pin 148, and terminating on an arcuate line 156 abutting the rear terminal edge of under pan 134 of trough section 85.

The upper reach of conveyer chain 14 is guided along trough section 85 by a gib section 156a similar to the gib sections 88, 98 and 107 of trough sections 82, 83 and 84, respectively, previously described. The rear trough section 86 also has a short gib section 157 adjacent its front end. A short intermediate gib section 158 is recessed at 159 in the floor plate 144, substantially on the axis of articulation between trough sections 85 and 86. Said intermediate gib section 158 is connected to a plate 160 slidably mounted along and within the adjacent end of gib section 157 (see Figure 16), in the same manner that the intermediate gib section 115 is mounted for lateral adjustment between gib sections 98 and 107, on the axis of articulation between trough sections 83 and 84 at the front end of the machine.

The lower reach of the conveyer has its chain positively guided along trough member 85 in a gib member 161 similar to the gib member 108 of trough member 84, and carried on the under face of floor plate 144, with flared sides 162, 162 terminating at the axis of articulation (see Figure 2) so as to guide the chain in all laterally adjusted positions of the rear trough section 86. In the rear trough section 86, the lower reach of the conveyer is guided by lateral engagement of the conveyer flights along its under pan 146.

The gap between the side walls of the adjacent trough sections 85 and 86 is closed by hinged side plates 163, 163, and auxiliary plates 164, 164 of substantially the same form and arrangement as the hinged plates 118, 118, and auxiliary plates 122, 122, which close the gaps between the trough sections 83 and 84, as previously described.

The conveyer chain 14 is driven from a chain sprocket 165 on cross shaft 166 having suitable bearings on the main frame below the fixed trough section 84 (see Figures 2, 4, 8, 9 and 10). The chain 14 is trained over idler rollers 167, 168 disposed forwardly and rearwardly of shaft 166, to increase the wrap of the chain over sprocket 165. The shaft 166 has dual chain sprockets 169 at one end thereof connected by chains 170 to sprockets 171 on a clutch shaft 172. Suitable clutch means are mounted on said shaft to connect a bevel gear 173 with said shaft, in the form shown herein the clutch means comprising a multiple disc clutch of well known construction indicated at 174. The bevel gear 173 is driven by bevel pinion 175 fixed on the front end of the armature shaft 35 of the electric motor 34. The engagement and disengagement of the clutch 174 is controlled by an endwise adjustable member 176 threaded on a relatively fixed sleeve 177 concentric with shaft 172 and acting on a pressure plate 178 through coil spring 179. The adjustable member 176 is manually controlled by a shaft 189, which extends outwardly through the side of the main frame 10 (see Figure 3) and is shiftable longitudinally so that a pinion 181 may engage a toothed gear 182 carried by the member 176, to rotate the latter in either direction.

The rear trough section 86 is swung laterally by power from a hydraulic cylinder device 183 having one end pivotally connected to the bracket 140 on one side of the main frame, and the other end pivotally connected to a bracket 184 on the adjacent side of the trough section 86.

The hydraulic control system and the hydraulic actuating devices used in effecting the several operating or adjusting functions of the machine are disclosed in my divisional application Serial No. 488,603, filed May 26, 1943, so are not described in detail herein.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a loading apparatus, a flight conveyer including trough sections pivotally connected at adjacent ends for relative lateral swinging adjustment, each of said trough sections including an upper floor plate for supporting the upper strand of the conveyer and a lower floor plate for guiding the lower strand of the conveyer, the upper floor plate of one of said trough sections extending beyond the pivotal axis of articulation in one direction and terminating in concentric abutting relation with the upper floor plate of the second trough section, and a lower floor plate of said second section extending beyond the pivotal axis of articulation in the opposite direction and terminating in concentric abutting relation with the lower floor plate of said first section.

2. In a loading apparatus, a flight conveyer of the single center chain type including two trough sections pivotally connected at adjacent ends for relative lateral swinging adjustment, one of said trough sections having a floor plate extending beyond the axis of articulation and terminating in concentric abutting relation with the floor plate of the second trough section, chain center gib sections mounted on both of said floor plates, each terminating short of the axis of articulation, and an intermediate gib section mounted for lateral swinging movement relative to the floor plate of said first trough section across the axis of articulation, and having operative connection at opposite ends to the adjacent ends of said gib sections.

3. In a loading apparatus, a flight conveyer of the single center chain type including two trough sections pivotally connected at adjacent ends for relative lateral swinging adjustment, one of said trough sections having a floor plate extending beyond the axis of articulation and terminating in concentric abutting relation with the floor plate of the second trough section, chain center gib sections mounted on both of said floor plates, each terminating short of the axis of articulation, and an intermediate gib section mounted for lateral swinging movement relative to the floor plate of said first trough section across the axis of articulation, said intermediate gib section having pivoted connection to the adjacent end of one of said gib sections, and pivoted and sliding connection relative to the adjacent end of the other gib section.

4. In a loading apparatus, a flight conveyer including trough sections pivotally connected at adjacent ends for relative lateral swinging adjustment, each of said trough sections including an upper floor plate for supporting the upper strand of the conveyer, the upper floor plate of one of said trough sections extending beyond the pivotal axis of articulation in one direction and terminating in concentric abutting relation with the upper floor plate of the second trough section, means rigid with the second trough section having overlapping engagement with the upper floor plate of the upper trough section during relative swinging movement of said sections, the lower floor plate of said second section extending beyond the pivotal axis of articulation in the opposite direction and terminating in concentric abutting relation with the lower floor plate of said first section, and means rigid with the first trough section having underlapping engagement with the lower floor plate of the second trough section during relative swinging movement of said sections.

FRANK CARTLIDGE.